United States Patent [19]

Koszytorz

[11] 4,379,203

[45] Apr. 5, 1983

[54] HOUSING FOR LASER APPARATUS

[75] Inventor: Günther Koszytorz, Erlangen, Fed. Rep. of Germany

[73] Assignee: Siemens Aktiengesellschaft, Munich, Fed. Rep. of Germany

[21] Appl. No.: 265,456

[22] Filed: May 20, 1981

[30] Foreign Application Priority Data

May 23, 1980 [DE] Fed. Rep. of Germany ....... 3019915

[51] Int. Cl.³ .............................................. H01S 3/04
[52] U.S. Cl. ............................. 174/15 R; 165/80 C; 361/385; 372/35; 372/109
[58] Field of Search ........................... 174/15 R, 16 R; 165/80 C; 313/12, 22, 35, 36; 361/379, 382, 383, 384, 385; 372/34, 35, 81, 109

[56] References Cited

FOREIGN PATENT DOCUMENTS 2346219 5/1975 Fed. Rep. of Germany ........ 372/34

Primary Examiner—Laramie E. Askin
Attorney, Agent, or Firm—Kenyon & Kenyon

[57] ABSTRACT

Disclosed is a housing for a laser device. The housing is of cylindrical shape and comprises two semi-cylindrical housing halves connected by a hinge. Each housing half includes a cutout in a planar inner portion thereof extending in the housing half parallel to the axis thereof. The cutout base of a lower housing half serves as a mounting surface for the laser device. Between the cutout and a circular outer surface of at least one of the housing halves are disposed canals for a coolant and a cable channel for electric wires going to the laser apparatus. Because the canals are brought into the housing separately, the housing of the invention saves space and facilitates maintenance.

5 Claims, 2 Drawing Figures

HOUSING FOR LASER APPARATUS

BACKGROUND OF THE INVENTION

The present invention relates to a housing for laser apparatus to which a coolant is supplied and which includes electrical supply lines.

Housings are known for enclosing commercially available laser apparatus mounted on an optical bench. The feed and discharge lines for the coolant and the electrical supply lines extend into the interior of the housing beside the optical bench. Maintenance and operation of the laser apparatus are impaired by the freely arranged inlets and outlets for the coolant and by the lines for the electrical supply. The volume occupied by such a housing is excessive for a number of applications due to the space required for the supply lines. For laser apparatus, a stiff mounting surface is needed which resists twisting and bending. In conventional apparatus, this is achieved by a sufficiently thick plate.

OBJECT AND SUMMARY OF THE INVENTION

It is an object of the present invention to provide a housing for a laser or like device to which a coolant is supplied which occupies as little space as possible, which provides easy access to the device for servicing, and which is easy to assemble.

According to the invention, a housing is provided of cylindrical shape comprising two semi-cylindrical housing halves, each of which has a semi-circular outer surface and a planar inner surface. Each of the housing halves includes a cutout in the planar inner surface which cutouts are oppositely disposed and form a chamber when the two housing halves are oppositely disposed in the assembled configuration of the housing. The base of at least one of the cutouts forms a planar mounting surface for the laser apparatus. In at least one of the housing halves are disposed at least two canals or conduits for a coolant and at least one cable channel or conduit for wires going to the laser apparatus. The canals and channels are provided between the cutout and the semi-circular outer surface of that housing half. Means are provided for joining the two housing halves together.

By integrating the coolant canals and the cable channel in the wall of the housing and by providing oppositely disposed cutouts to form a chamber, a small unencumbered space for the laser apparatus is formed. By eliminating supply hoses, the maintenance of the laser apparatus is facilitated and access to the laser device is improved.

The base of the cutout of one of the housing halves serves as the mounting surface for installing the laser apparatus and at the same time serves as an optical bench. A heavy mounting plate and an optical bench, necessary in conventional apparatus, are unnecessary in the housing of the invention and thereby the weight of the housing and mounting structure is distinctly decreased. The housing of the invention is stiff enough to resist twisting and bending and due to the large volume of the housing wall, is furthermore sufficiently resistant to mechanical stress.

Forming the housing of two semi-cylindrical halves permits simple assembly of the housing and provides ready access to the laser apparatus. A cylindrical housing has the further advantage that it can be enclosed by commercially available pipe clamps and can be fastened on a mounting surface. A cylindrical housing also has the advantage that the entire laser apparatus is movable in the axial direction of the housing. This simplifies positioning of the laser device in a number of applications. For example, a laser recorder within a housing according to the invention in which the writing head is arranged concentrically with the cylinder axis at an end face of the housing, can be employed with great versatility since the writing head can also be inserted into narrow spaces without undue effort. Due to the cylindrical shape, the writing plane is always at the same distance from the housing. Thereby, the writing head can be swung 360° without reservation.

Moreover, a cylindrical housing according to the invention provides the further advantage of requiring less space.

According to one aspect of the invention, the joining means comprises a hinge attached at one end of the planar inner surfaces of the housing halves parallel to the axis of the cylinder. Such a hinge enables quick opening and closing of the housing without requiring additional tools.

The two housing halves can be identical, thereby simplifying manufacture and stocking, and reducing cost.

These and other objects, aspects, features and advantages of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which.

DESCRIPTION OF THE PREFERRED EMBODIMENT

Figure 1:
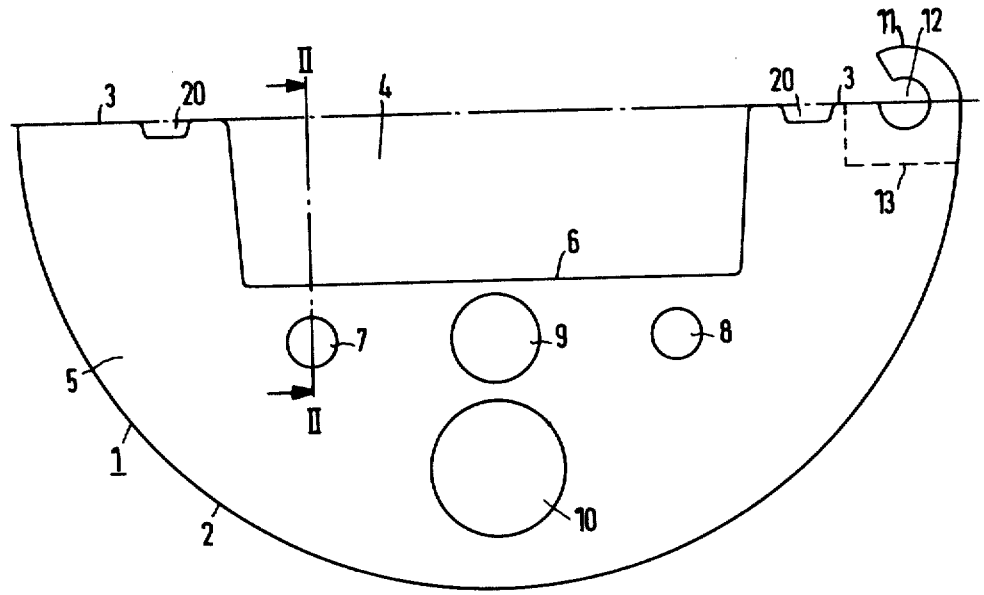
FIG. 1 is a front view of one of the semi-cylindrical housing halves according to the invention.

Referring more particularly now to the drawings, a housing according to the invention for laser apparatus is shown. The housing is cylindrical in shape and comprises two semi-cylindrical halves, a lower one of which is depicted in FIG. 1. The lower housing half 1 is bounded by a semi-circular outer surface 2, a planar inner, contact surface 3 with a cutout 4, and front and rear end faces 5. The front end face is shown in FIG. 1; the rear end face (not shown) is of identical outline to the front end face and is situated at the opposite end of the housing. The cutout 4 is centered in the planar contact surface 3 and extends between the end faces. The cutout 4 can be considered continuous and approximately of rectangular cross section. A base 6 of the cutout 4 includes a planar surface parallel to the contact surface 3.

The inlet canals 7 and 8 and a discharge canal 9 between the base 6 of the cutout 4 and the outer surface 2 are provided for a coolant, for example, water. The cross sectional area of the discharge canal 9 is twice as large as the cross sectional area of each individual inlet canal 7 and 8. There is further provided between the base 6 and the outer surface 2 a cable channel 10 for wires of an electrical power supply (not shown). The cross-sectional area of the cable channel 10 is several times that of the discharge canal 9. The cable channel 10 is situated between the discharge canal 9 and the outer surface 2. The cross sectional shape of canals 7-10 is circular and the canals linearly extend between the two end faces 5 parallel to the cutout 4.

The two semi-cylindrical housing halves 1 can be identical. The cutout of the upper housing half (not shown) rests on the lower housing half and is disposed approximately congruently over the cutout 4 of the lower housing half 1, so that both cutouts cooperate to form a small, unencumbered closed chamber for a laser device.

The two housing halves 1 are connected together by a hinge which extends parallel to the cylinder axis. The hinge comprises a plurality of eyes 11 located at the right-hand end (relative to FIG. 1) of contact surface 3 and a hinge pin (not shown) inserted through the eyes 11 to form a pivot 12 situated in the plane of the contact surface 3. Each eye 11 surrounds a part of the extent of the hinge pin. The eyes 11 are firmly connected alternatingly to the upper and lower housing halves with adjacent eyes (i.e. alternating upper and lower eyes) contacting each other when the upper housing half rests on the lower housing half. Between adjacent eyes on a respective housing half are provided recesses 13 each of which is engaged with a respective eye opposite thereto in the other housing half. The lengths of the eyes 11 and the recesses 13 are approximately equal. The hinge pin is secured at each of the front and rear end faces 5 by a snap ring, for example. A depression 20 of approximately trapezoidal cross section is provided in each part of the contact surface 3 adjacent to the cutout 4 and parallel to the cylinder axis. Into each depression 20, a rubber material is disposed which forms a seal to protect the chamber for the laser device formed by the two cutouts 4 against dirt and water after the two housing halves 1 are hinged together.

Figure 2:
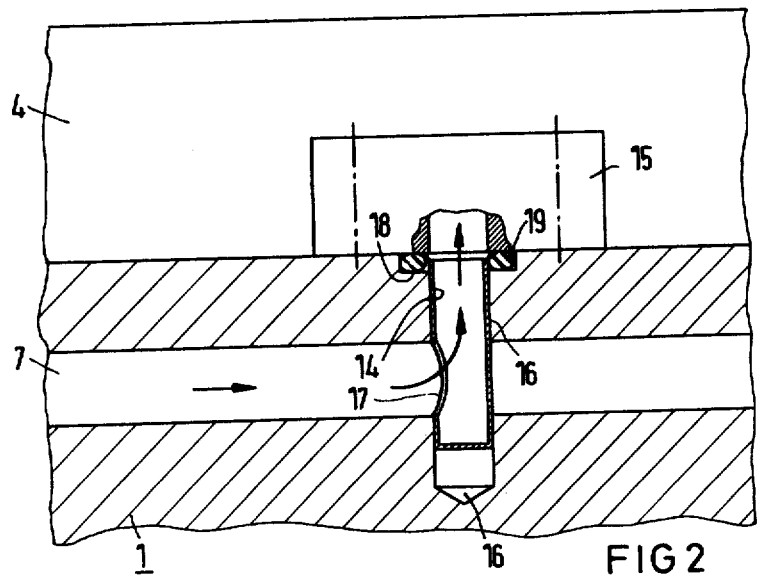
FIG. 2 is a section view taken along line II—II of FIG. 1.

Referring to FIG. 2, a connecting piece 14 is arranged on the mounting surface between the inlet canal 7 of the coolant and a component of the laser device which is to be cooled. The connecting piece 14 is a nipple pressed into a hole 16 which starts from the cutout base 6, extends through part of the housing half and the input canal 7, and ends below the input canal 7. The nipple 14 has a hole 17 by which the interior of the nipple 14 is communicated with the input canal 7. A depression 18 is provided in the mounting surface 6 concentrically with hole 16 and into which an O-ring seal, for example, is inserted. The part to be cooled, 15, is bolted to the cutout base 6 and is thereby pressed against the seal 19. In the pressed condition, the bolted-on part 15 rests against the mounting surface 6 of the cutout and thereby assumes a defined position in which a liquid-tight seal is provided against the cutout 4.

The connecting piece 14 conducts the coolant in a flow path indicated by the arrows in FIG. 2 from the input canal 7 and into the cooling loop of the part 15. Coolant does not flow into that portion of the input canal 7 situated to the right (in FIG. 2) of the connecting piece 14. Through a further connecting piece (not shown), however, the coolant is returned from the cooling loop of part 15 either back to the input canal 7 or into the discharge canal.

Other configurations and arrangements of a connecting piece are also possible. A connecting piece may, for example, have two holes 17 which are concentric with each other, so that coolant is diverted to the connecting piece to the part to be cooled while coolant continues to flow through the input canal 7 to that portion situated to the right of the connecting piece in FIG. 2. With such a diverting connecting piece, a parallel connection, for example, can be obtained in the cooling system.

The coolant can be fed into the input canals 7 and 8 at a pressure of several bars.

Between the two end faces 5, several connecting pieces lead from the canals 7 to 9 to the cutout 4 for supplying parts of the laser device. In the laser device, which can be a neodymium-YAG laser, a flash bulb optical pump device and a Q-switch can be cooled. The cooling system of the laser device can comprise two parallel cooling branches and the coolant, which can enter the housing at one of the end faces 5 thereof into the input canals 7 and 8, can be conducted through the two cooling branches. One cooling branch can comprise input canal 7, to which the cooling loop of the laser can be connected. The other cooling loop can comprise input canal 8, to which a parallel circuit of cooling loops for the flash bulb and the Q-switch can be connected. The heated coolant arriving at the ends of the input canals 7 and 8 at the opposite end face can be conducted through flexible tubes (not shown) to the input of the discharge canal 9 at the opposite end face. After flowing through the discharge canal 9, the heated coolant can leave the housing at end face 5 where the fresh coolant can be introduced into the input canals 7 and 8. The fresh coolant and the heated coolant can flow through the housing half 1 in opposite directions. The canals 7 to 10 of only one of the housing halves can be used for supplying the laser device.

Holes can be arranged at suitable points between the cutout base 6 and the cable channel 10 for running electrical wires from the cable channel 10 into the cutout 4.

The end faces of the cylindrical housing are each closed off by an end plate which is detachably fastened to the respective end face. Each end plate includes feed-throughs for nipples leading to the canals 7 to 10 and has the same geometric arrangement as the respective end face. The coolant can be fed in and discharged through flexible tubes, the nipples of which can be screwed into the canals 7 to 9. Other parts can also be fastened to the end plates. The end plates protect the end faces, and thus the cutout 4, from dirt and mechanical stress.

The housing halves can be made of aluminum by an extrusion process.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purposes of the disclosure without departing from the spirit and scope of the invention.

What is claimed is:

1. A housing for laser apparatus to which a coolant is supplied and which is provided with electrical lines, the housing comprising two semi-cylindrical housing halves which in the assembled configuration of the housing form a cylindrical housing, each housing half comprising a semi-circular outer surface and a planar inner surface having a cutout extending therein parallel to the axis of the housing half, the cutouts of the respective housing halves being oppositely arranged in the assembled configuration of the housing to form a chamber, each cutout including a base and the base of at least one of the cutouts being a planar surface, between the cutout and the semicircular outer surface of at least one of the housing halves are disposed parallel to the axis of that housing half at least two canals for coolant and at least one cable channel for electrical wires, and means for joining the two housing halves together.

2. The housing according to claim 1, wherein the cutout of at least one of the housing halves includes the planar base and said at least one housing half also includes the canals and the cable channel.

3. The housing according to claim 2, wherein the joining means comprise a hinge extending parallel to the axis of a respective housing half and disposed at one end of the inner surface of a respective housing half.

4. The housing according to claim 1, 2 or 3, wherein the two housing halves are identical.

5. The housing according to claim 1 or 2 comprising connecting means in at least one of the housing halves extending between at least one of the coolant canals and the cutout.

* * * * *